Patented Sept. 11, 1934

1,973,211

UNITED STATES PATENT OFFICE 1,973,211

TREATMENT OF SILICEOUS MATERIALS

Alfred Kirkham, Manchester, England, assignor to Peter Spence & Sons, Limited, Manchester, England No Drawing. Application March 19, 1931, Serial No. 523,946. In Great Britain March 28, 1930

3 Claims. (Cl. 23—182)

This invention has reference to the preparation of substantially pure silica in light form, to the treatment of certain residues from naturally occurring silicates, and to the production of concentrates of titanic acid not brought into solution during the process. The said silicates are such as are capable of being decomposed by treatment with suitable mineral acids by known means with the removal in solution of the major part of the more readily acid-soluble constituents, such, for example, as alumina, iron oxide, alkalies, and alkaline earths, the silica remaining substantially undissolved. The siliceous residues from such treatment contain a high percentage of silica previously in a combined form, and which may shortly be described as decomposed silicate silica, and in some cases where titanium oxide is a constituent they contain also an appreciable amount of this oxide left undissolved by the acid, and a part of my invention consists in the production of a concentrate of titanic acid with only a relatively low percentage of other constituents like alumina, iron oxide, or silica, from natural silicate-containing raw materials, e. g., some clays or bauxites containing an original proportion of titanium oxide and a relatively high percentage of other constituents such, for example, as alumina and silica.

It is known, see British Patent No. 294,681, to treat such residues with a hot solution or solutions of monocarbonated alkali under such conditions that a portion of the carbonic acid is liberated and allowed to escape, the greater part of the silica is dissolved and subsequently precipitated from the filtered solution by cooling such solution with the addition thereto of alkali acid carbonate or of carbonic acid. I have now found that by the employment of solutions of alkali mono-carbonate of suitable concentrations and containing sufficiently high ratios of alkali mono-carbonate to silica, I am able to effect the dissolution of the decomposed silicate silica with little or no loss of carbonic acid, and subsequently the precipitation of the greater part of the dissolved silica without the addition of alkali acid carbonate or of carbonic acid, and also obtain a product of increased lightness and improved quality.

In carrying my invention into effect I treat the washed, or washed and dried, or washed, dried and ignited, residues from the indicated acid treatment of the said silicates, preferably substantially free from mineral acid and in powder form, under agitation, and in one or more operations, with a hot solution or solutions of monocarbonated alkali (potash or soda which are equivalents), preferably carbonate of soda, at atmospheric pressure and at a suitable regulated temperature for about one or more hours employing a higher ratio of alkali mono-carbonate to silica than indicated in British Patent No. 294,681. By this means I obtain in solution all or nearly all the decomposed silicate silica with little or no loss of carbonic acid, and also produce a concentrate of the insoluble titanium oxide when this oxide is present. I may, for example, readily effect the solution of the silica by treatment at atmospheric pressure and at temperatures at or below the boil, e. g., about 90°–100° C. with a solution of sodium mono-carbonate of about 1.20 to 1.28 specific gravity at 90° C. using a molecular ratio of silica to sodium mono-carbonate of e. g., about $SiO_2:5Na_2CO_3$. The residual undissolved matters are separated by known means from the solution with the minimum loss of heat in order to avoid the premature precipitation of silica and retain under control the most suitable conditions of cooling and agitation during the period of precipitation. To effect the separation of the silica from the solution in a form which may give a product of a very low apparent specific gravity, I prefer to effect the cooling of the liquors rapidly. more especially in the earlier stages, by known means, and under suitable agitation. As an indication of the rate of cooling which may be desirable, I prefer to cool from about 90° C. to about 50° C. in from about 15 minutes to 30 minutes. By further cooling the solution to a suitable temperature, e. g., to a temperature a little above the point at which crystallization of alkali carbonate might take place, I obtain the separation of a large proportion of the silica in a non-gelatinous somewhat flocculent easily filterable white and more or less opaque condition in combination or association with a small proportion of alkali. The hydrated product thus precipitated retains its light open and bulky condition on further treatment and drying, and after suitable disintegration yields an extremely light and fine powder.

The precipitated silica is separated by known means from its mother liquor (which still contains a proportion of silica in solution and which may be suitably treated to compensate for the small amount of alkali combined or associated with the precipitated silica and obtain a substantially mono-carbonated alkali solution for re-use in attacking a fresh quantity of crude siliceous residue) and is then washed with water to remove as much as practicable of the combined or associated alkali, e. g., soda. The washed product, which still retains a certain amount of combined or fixed alkali, may then be treated with a dilute suitable acid or a suitable salt solution to remove or replace such remaining amount, and finally water washed. The wet practically pure hydrated silica or hydrated silica containing or in combination with other compounds as a result of the removal of part or all of the fixed alkali present in the precipitated silica thus obtained may be separated by known means from as much water as practicable, and dried, if desired. The dried product may, if desired, be passed through a fine sieve and forms a white soft powder of very low apparent specific gravity—so much so that about 7 or 8 grams of the substantially pure hydrated silica may occupy a volume of about 100 cubic centimetres. I may control to a considerable extent the apparent specific gravity of the dried product by regulation of the speed with which the solutions are cooled, particularly above about 60° C., and of the degree of agitation. Generally more retarded rates of cooling, particularly about above 60° C., give higher apparent specific gravities of the product.

As an example of how I may carry the process into effect in the preparation of hydrated silica in a form when dry of low apparent specific gravity, I may take a quantity of washed, dried and ignited residue in powder form containing about 80% $SiO_2$, obtained by a sulphuric acid treatment of a natural silicate as described, add to it a solution of sodium mono-carbonate of about 1.24 sp. gr. in such proportions as will give a molecular ratio of about $SiO_2:5Na_2CO_3$ and treat this mixture in a suitable vessel under agitation at about the boil for from 1 to 2 hours. During this operation, an extraction of about 90% of the silica may be obtained. The insoluble matter may now be separated from the solution whilst hot by known means and systematically washed first with hot wash liquors from previous operations and finally with hot water. The mother liquor and the first strong wash may now be suitably agitated, rapidly cooled to about 50° C. in about 20 minutes, further cooled to about 30° C. in about 1 to 1½ hours and the precipitated silica filtered and systematically washed with wash liquors and then with water. It may, thereafter, if desired, be treated with dilute sulphuric acid and again water washed to remove the small amount of fixed or combined soda it contains. The substantially pure hydrated silica may now be dried and passed through a fine sieve.

What I claim as my invention and desire to secure by Letters Patent is:—

1. The process of preparing solutions of silica from siliceous residues resulting from the treatment of natural silicates with mineral acids which process comprises treating the residues with a hot solution of sodium carbonate, the sodium carbonate being in excess of the silica in the ratio of at least five sodium carbonate to one silica.

2. The process for producing substantially pure silica in light form which comprises treating the residues resulting from treating natural silicates with mineral acids with a hot solution of sodium carbonate, the sodium carbonate being in excess of the silica in the ratio of at least five carbonate to one silica, precipitating the silica by cooling the solution, and washing the precipitated silica with water.

3. The process for producing substantially pure silica in light form which comprises treating the residues resulting from treating natural silicates with mineral acids with a hot solution of sodium carbonate, the sodium carbonate being in excess of the silica in the ratio of at least five carbonate to one silica, precipitating the silica by cooling the solution, washing the precipitated silica with water to partially remove the alkali, and treating the washed precipitate with mineral acid.

ALFRED KIRKHAM.